Dec. 19, 1950   C. B. FLAVIN   2,534,763
EXTERIOR-TYPE SUN VISOR
Filed May 17, 1948
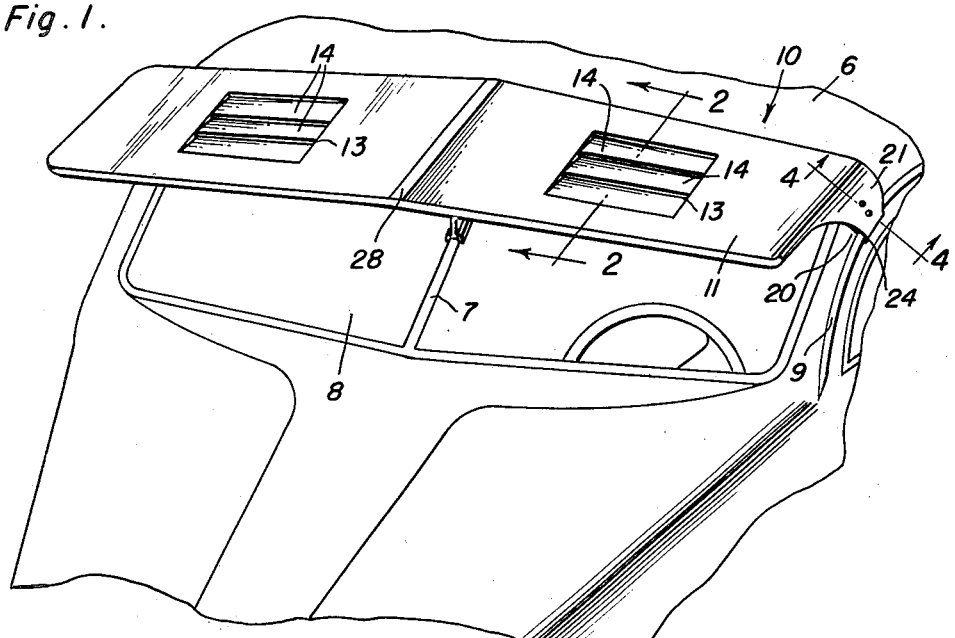
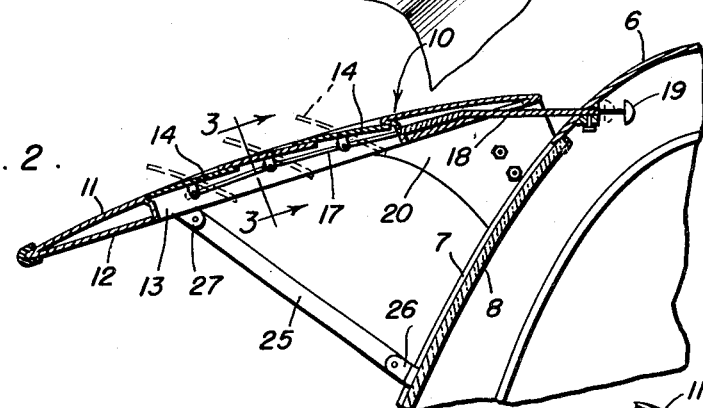
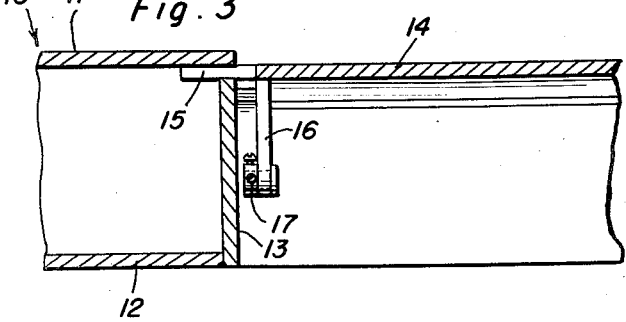
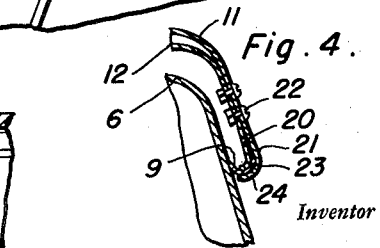
Inventor
Clarence B. Flavin
By Clarence A. O'Brien
and Harvey B. Jacobson
Attorneys Patented Dec. 19, 1950

2,534,763

UNITED STATES PATENT OFFICE 2,534,763

EXTERIOR-TYPE SUN VISOR

Clarence B. Flavin, Flint, Mich.

Application May 17, 1948, Serial No. 27,502

2 Claims. (Cl. 296—95)

The present invention relates to certain new and useful improvements in an exterior-type sun visor for automobile windshields and has more particular reference to shutter means which is incorporated in the provisor body construction in a manner to permit the driver of an automobile to clearly see overhead traffic lights, particularly the types which are suspended above the center of an intersection.

Needless to say, I am sufficiently conversant with the state of the prior art to realize that many and varied types of sun visors have been adopted and used and that it is not new to employ louvers, shutters and equivalent devices to facilitate a driver's observation of overhead conditions. Therefore, in carrying out the present invention it is my primary aim to structurally, functionally and otherwise improve upon known sun visors and to achieve the desired ends through the use of a practical and efficient adaptation of structural parts.

More specifically, novelty is predicated upon a sun visor having observation openings and readily closable and openable shutters fitted into said openings, the shutters in the respective groups being simultaneously operable but conveniently controlled to attain the desired ends with requisite efficiency and certainty.

Another object of the invention is to provide especially constructed wing-like extensions at the opposite outer ends of the visor, said extensions having novel fastening means connectable with coacting portions of the usual rain collecting and pisposal gutters or troughs.

Other objects, features and advantages will become more readily apparent from the following description in the accompanying illustrative drawings.

In the drawings, wherein like numerals are employed to designate like parts throughout the views:

Figure 1 is a fragmentary perspective view showing a portion of an automobile and also showing the sun visor as constructed in accordance with the principles of the present invention;

Figure 2 is a cross section on the line 2—2 of Figure 1, looking in the direction of the arrows;

Figure 3 is an enlarged fragmentary sectional view on the line 3—3 of Figure 2, looking in the direction of the arrows;

Figure 4 is a fragmentary sectional view on the approximate line 4—4 of Figure 1.

Referring now to the drawings by distinguishing reference numerals, the roof of the automobile is denoted by the numeral 6, the windshield frame by the numeral 7 and the windshield panels by the numerals 8. The usual drainage gutters or troughs are denoted by the numerals 9.

The improved sun visor, in a unitary structural sense, is denoted by the numeral 10 and is of customary shape and general construction. It is here shown as having spaced complemental members 11 and 12 provided with sight openings 13. The construction of each sight opening and shutter means is the same and a description of one will suffice for both. The shutters are appropriate overlapping panels 14 having journals 15 at their ends rockably mounted in appropriate bearings in the marginal frame of the sight opening. The shutters are also provided with rocker arms 16 operatively connected with one another by a Bowden wire 17. This wire is operable through an appropriate casing 18 as shown in Figure 2 and a suitable push-pull knob 19 is provided. Thus, I have a sight opening and a visor and several rockably mounted shutters forming a closure for the sight opening and interconnected by a Bowden wire or equivalent operating means, whereby said shutters may be opened and closed at will.

The opposite transverse end portions of the complemental sheet members 11 and 12 are provided with relatively narrow wing-like extensions 20 and 21 and these are bolted or otherwise secured together as at 22 for rigidity and also for clamping purposes. The terminal portions of the extensions are considerably narrowed and are then fashioned into suitably contoured hooks 23 and 24 and these hooks engage inner and outer surface portions of the gutter means 9 whereby, as shown in Figure 4, the visor has its end portions appropriately perched and mounted on said gutters. A central stay link is also provided and said link 25, as shown in Figure 2, has one end connected with a bracket 26 which in turn is connected with a windshield frame as shown. Then, there is an additional bracket 27 which is connected to the under side of the visor. The visor, if desired, may be provided with a chromium finishing strip, as at 28 to coact with the usual central strip on the windshield frame structure to provide for uniformity of appearance.

Novelty is predicated on the one hand on a sun visor embodying spaced sheet members having tapering and relatively narrow wing-like extensions, said extensions being connected together then terminating in hooks 23 and 24 to engage the existing or stock gutter 9, this in conjunction with a stay link 25 and brackets 26 and 27 whereby an intermediate portion of the sun visor is properly balanced and rigidly supported.

Additional novelty has to do with the window-like openings or sights formed in opposite end portions of the sun visor and provided with closing panels or shutters, together with Bowden wires or the like to manually open and close the shutters as needed. Normally the shutters are opened before reaching an intersection to enable the driver to see the overhead traffic lights. The shutters also come in handy to permit rain to enter and to splash against the windshield to facilitate the operation of windshield wipers. Often, where the sun visor overhangs the windshield, the windshield will be dry and dirt and mud which may have accumulated thereon will be difficult to wash off. Where however, the shutters are opened and the rain is let in, so to speak, it facilitates the step of washing the glass panels in the windshield.

A careful consideration of the foregoing description in conjunction with the invention as illustrated in the drawings will enable the reader to obtain a clear understanding and impression of the alleged features of merit and novelty sufficient to clarify the construction of the invention as hereinafter claimed.

Minor changes in shape, size, materials or rearrangements of parts may be resorted to in actual practice so long as no departure is made from the invention as claimed.

Having described the invention, what is claimed as new is:

1. An attachment for an automobile windshield comprising a sun visor, said sun visor having sight openings on opposite sides of its medium transverse portion, and shutter means closing the sight openings, said shutter means embodying hingedly connected shutters and individual manually operable Bowden wires connected with the shutters for opening and closing same.

2. An accessory for an automobile windshield comprising a sun visor having selectively usable individual sight openings on opposite sides of its medium transverse central portion, shutter means closing each sight opening, each said means embodying a plurality of coacting shutters operatively connected together by a Bowden wire, said Bowden wire having knob means for manual actuation adapted to be situated on the interior of an automobile when the visor is in position for use, the end portions of said visor being gradually narrowed and forming laterally directed wing-like extensions, said extensions having gutter engaging hooks and being such in lengths as to support the visor at a predetermined pitch relative to the windshield and with its rearward edge spaced above the surface of the automobile roof.

CLARENCE B. FLAVIN.

REFERENCES CITED

The following references are of record in the file of this patent:

UNITED STATES PATENTS

| Number | Name | Date |
|---|---|---|
| 1,645,216 | Berg | Oct. 11, 1927 |
| 1,735,177 | Pearce | Nov. 12, 1929 |
| 2,186,299 | Klas | Jan. 9, 1940 |
| 2,253,353 | Sharp | Aug. 19, 1941 |
| 2,310,086 | Howard | Feb. 2, 1943 |
| 2,334,856 | Atkinson | Nov. 23, 1943 |